United States Patent
Nilsson et al.

(10) Patent No.: US 9,443,347 B2
(45) Date of Patent: *Sep. 13, 2016

(54) TIME-CONTINUOUS COLLISION DETECTION USING 3D RASTERIZATION

(71) Applicant: Intel Corporation, Santa Clara, CA (US)

(72) Inventors: Jim K. Nilsson, Lund (SE); Tomas G. Akenine-Moller, Lund (SE)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/931,198

(22) Filed: Nov. 3, 2015

(65) Prior Publication Data

US 2016/0055666 A1 Feb. 25, 2016

Related U.S. Application Data

(63) Continuation of application No. 13/529,190, filed on Jun. 21, 2012, now Pat. No. 9,196,083.

(60) Provisional application No. 61/586,920, filed on Jan. 16, 2012.

(51) Int. Cl.
*G06T 15/40* (2011.01)
*G06T 15/10* (2011.01)
*G06T 15/80* (2011.01)

(52) U.S. Cl.
CPC .............. *G06T 15/10* (2013.01); *G06T 15/405* (2013.01); *G06T 15/80* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 6,583,787 | B1* | 6/2003 | Pfister | G06T 15/005 345/441 |
| 2003/0117398 | A1* | 6/2003 | Hubrecht | G06T 15/40 345/423 |
| 2006/0209078 | A1* | 9/2006 | Anderson | G06T 15/005 345/506 |
| 2010/0188404 | A1* | 7/2010 | Tong | G06T 11/40 345/426 |
| 2012/0147007 | A1* | 6/2012 | Woo | G06T 15/00 345/441 |
| 2012/0327071 | A1* | 12/2012 | Laine | G06T 15/30 345/418 |

OTHER PUBLICATIONS

Moller et al. ("Stochastic Rasterization using Time-Continuous Triangles", Graphic Hardware, 2009).*
Rendon et al. (Fast Continuous Collision Detection between Rigid Bodies) Euographics 2002).*
Kayvon et al. ("Data Parallel Rasterization of Micropolygons with Defocus and Motion Blur", the Association for Computing Machinery 2009).*
Moller et al. ("Conservative and Tiled Rasterization Using a Modified Triangle Set up" JGT 10(3) 2005) Tang et al. ("Interactive Continuous Collision Detection between Deformable Models Using Connectivity-Based Culling" IEEE 2009).*

* cited by examiner

*Primary Examiner* — Ming Hon
*Assistant Examiner* — Khoa Vu
(74) *Attorney, Agent, or Firm* — Trop Pruner & Hu, P.C.

(57) ABSTRACT

We present a technique that utilizes a motion blur (three dimensional) rasterizer to augment the PCS culling technique so that it can be used for continuous collision detection, which to the best of our knowledge has not been done before for motion blur using a graphics processor.

43 Claims, 5 Drawing Sheets

TIME-CONTINUOUS COLLISION DETECTION USING 3D RASTERIZATION

CROSS-REFERENCE TO RELATED APPLICATIONS

This is a non-provisional application based on non-provisional application Ser. No. 13/529,190 filed Jun. 21, 2012, and provisional application Ser. No. 61/586,920 filed Jan. 16, 2012, hereby expressly incorporated by reference herein.

BACKGROUND

This relates to the field of graphics processing.

Collision detection (CD) is used in games and other applications to handle interaction between objects. CD algorithms can be broadly divided into discrete and continuous methods. Discrete methods only detect if two objects collide at a specific (discrete) point in time. Events falling between such discrete times cannot be detected, which in some cases could be a severe limitation. For example, a fast object (e.g. a ball) moving towards a wall might experience a "tunneling" effect if it is in front of the wall at one inspected point in time (frame) and behind the wall at the next point in time. Continuous CD (CCD) algorithms on the other hand, avoid these problems by instead computing the time of the first contact between two objects. This is crucial for realistic animations, but also more expensive in terms of the necessary amount of computations.

A brute force technique to detect collision considers all moving triangles in a scene and compares them to all other triangles. A computationally relatively expensive triangle-triangle intersection test is performed between all pairs of triangles. With many objects, this technique becomes intractable. Therefore, different approaches to culling are taken, whereby (preferably large groups of) triangles are conservatively excluded from testing at an early stage. For instance, a rigid object can never collide with itself and its triangles can thus be excluded from testing against any other triangle in that object. Also, if the bounding box of one static object does not overlap with the bounding box of another static object, then these two objects do not need further collision detection, since they clearly will not collide.

Another such culling technique, N. K. Govindaraju, S. Redon, M. C. Lin, and D. Manocha, "CULLIDE: Interactive Collision Detection between Complex Models in Large Environments using Graphics Hardware", Graphics Hardware, pp. 25-32, 2003, utilizes occlusion queries (OQ) to create an ordering between objects in the scene. In short, a pair of objects belongs to a Potentially Colliding Set (PCS) if it cannot be conservatively established that the objects are not colliding at a discrete point in time. For each frame, the PCS is created by repeatedly performing an OQ for all axes (x, y, and z) and directions (positive, negative) for all objects. During this process, objects are removed from the PCS as it is detected that they do not collide. Detailed triangle-triangle intersection tests need only be performed between objects in the PCS.

However, an important drawback of the basic PCS culling technique is that it only handles discrete detection, i.e., if objects are moving too fast, the technique could potentially fail to detect collisions during a certain period of time.

BRIEF DESCRIPTION OF THE DRAWINGS

Some embodiments are described with respect to the following figures.

DETAILED DESCRIPTION

We present a technique that utilizes a motion blur three dimensional (3D) rasterizer to augment the PCS culling technique so that it can be used for continuous collision detection. We have chosen to describe our approach in relation to Govindaraju et al.'s work. However, it should be straightforward to extend our work to most existing graphics processing unit (GPU)-based CD methods.

We propose to use the conservative time and depth interval outputs of a three-dimensional (3D) rasterizer, Munkberg et. al, Hierarchical Stochastic Motion Blur Rasterization, High Performance Graphics, 2011, to construct a PCS that handles continuous collision detection.

In order to detect whether two objects do not (conservatively) collide at a certain instant in time, the first object is rendered to the depth buffer. In a second pass, the depth test is reversed, and the second object is rendered with an occlusion query. If no fragments pass, then there is no chance of collision between the two objects. We call this an overlap test.

This is done orthographically in the xy, xz, and yz planes, and also from opposite directions. In total, this sums to six overlap tests. If at least one of these tests indicates that there is no collision, then the pair does not belong to the PCS. If motion is introduced to the scene, then an OQ extended to handle motion blur can replace the "static" OQ.

However, note that a conservatively correct PCS is not computed since that type of OQ is based on sampling at the discrete times of the samples of the pixels. The probability of detecting whether the ball collides with the solid wall increases, but there are no guarantees. In addition, the number of samples per pixel can be increased to further increase the probability, but that will become too expensive, and still will not solve the problem.

Instead, in some embodiments we propose a substantially different approach. Since we want to solve collisions in time, we note that it is possible to use a three-dimensional rasterizer for this problem. We use one sample per pixel, a tile size of 1×1 pixels, and only pixels with non-empty triangle/pixel time overlap intervals, survive and are sent downstream to the pixel shader. Hence, we use a conservative stochastic rasterizer both in time and spatially.

Figure 1:
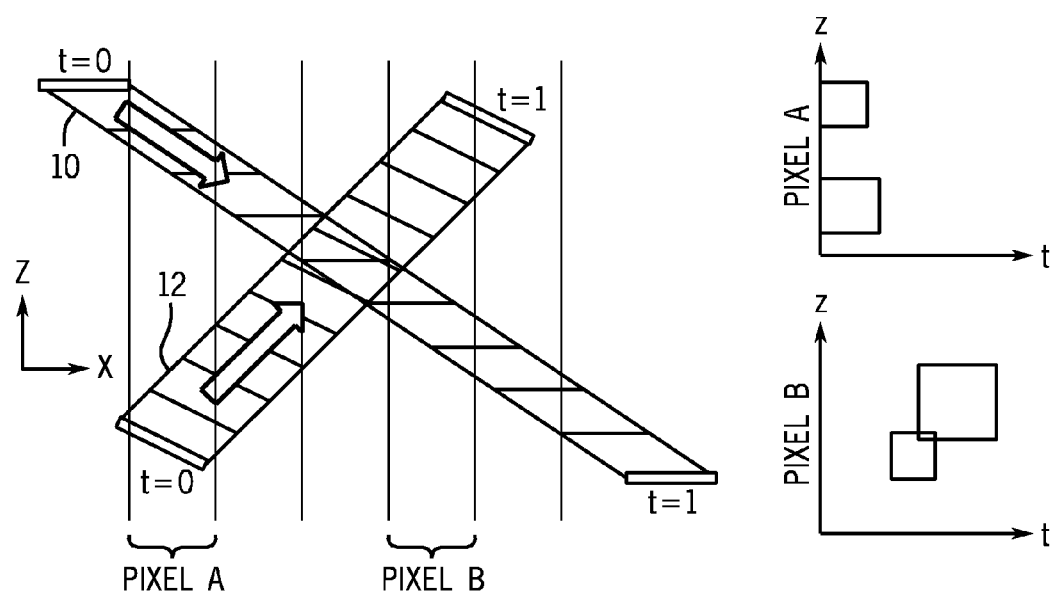
FIG. 1 is a depiction of a continuous collision detection in two dimensions, x and z according to one embodiment.

The basic approach for CCD is illustrated here in two dimensions for two moving lines in FIG. 1. The lines 10 and 12 move from t=0 to t=1. For pixels A and B, the conservative bounds for time, t, and depth, z, are visualized to the right. As can be seen, the two lines can never overlap in pixel A, since the bounding boxes in the tz-plane for lines 10 and 12 do not overlap. For pixel B, the bounding boxes in the tz-plane for the two lines indicate that the triangles may overlap, which in fact they do in this case.

There are many different ways to extend the collision detection technique to handle many triangles per object. We describe two such methods here. For the first object, we simply initialize the RGBA of each pixel to contain an empty bounding box. For each triangle being rasterized to a pixel, the pixel's bounding box is extended so it represents the union of the box in the RGBA buffer and the incoming fragment's box. For the second object, a similar buffer is generated. When both buffers have been created, pixels with same xy-coordinates perform a simple box versus box overlap test. If the boxes do not overlap for a certain pixel, no collision can occur in that pixel. This is illustrated to the left in FIG. 2 for a situation where the boxes do overlap.

Figure 2:
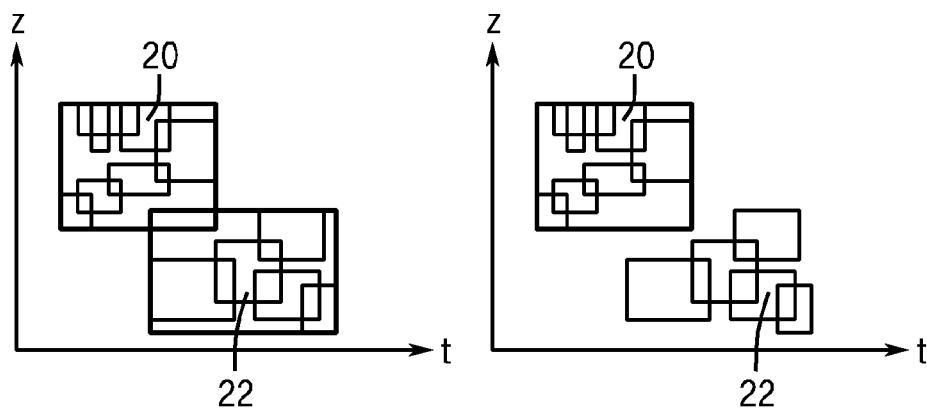
FIG. 2 is an illustration of collision detection in a single pixel between an object consisting of many triangles according to one embodiment.

FIG. 2 is an illustration of collision detection in a single pixel between an object, consisting of many triangles, with tz-fragments 20, and one object with fragments 22. On the left in FIG. 2 bounding boxes of the union of all tz-fragments 20, 22 for the objects are accumulated, and used for overlap testing. On the right side in FIG. 2 an alternative is to accumulate the union of the first object 20 to generate a bounding box, and then during rasterization of the object 22, the tz-fragments are individually tested for overlap against the bounding box of the red fragments. This latter method is more efficient in this example, since it would not detect any overlap for this pixel.

Figure 3:
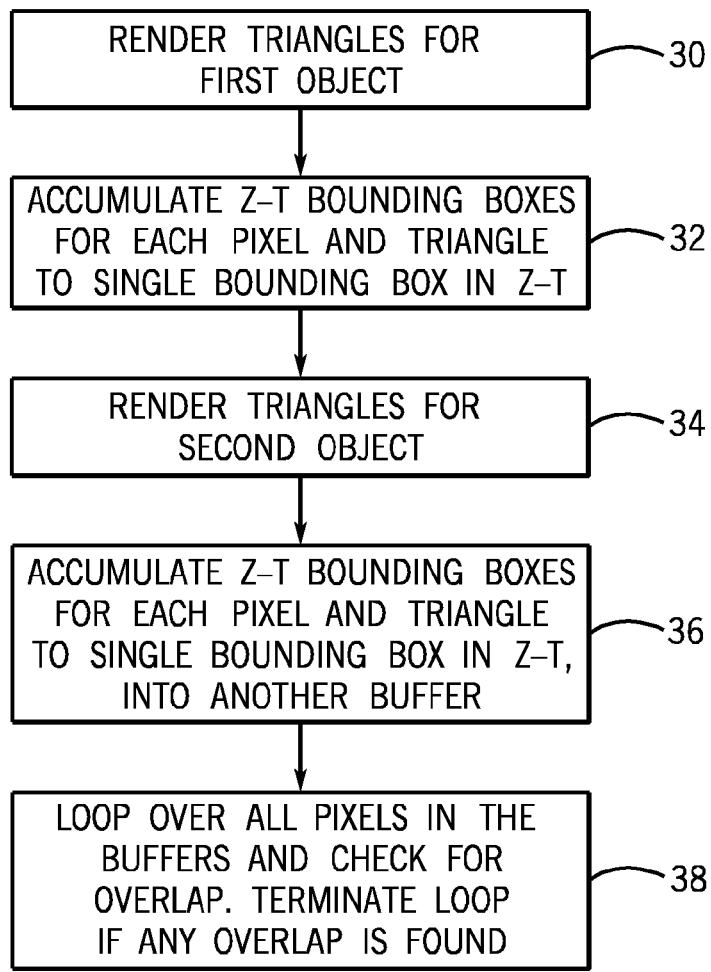
FIG. 3 is a flow chart for one embodiment for testing overlap between two objects.
Figure 4:
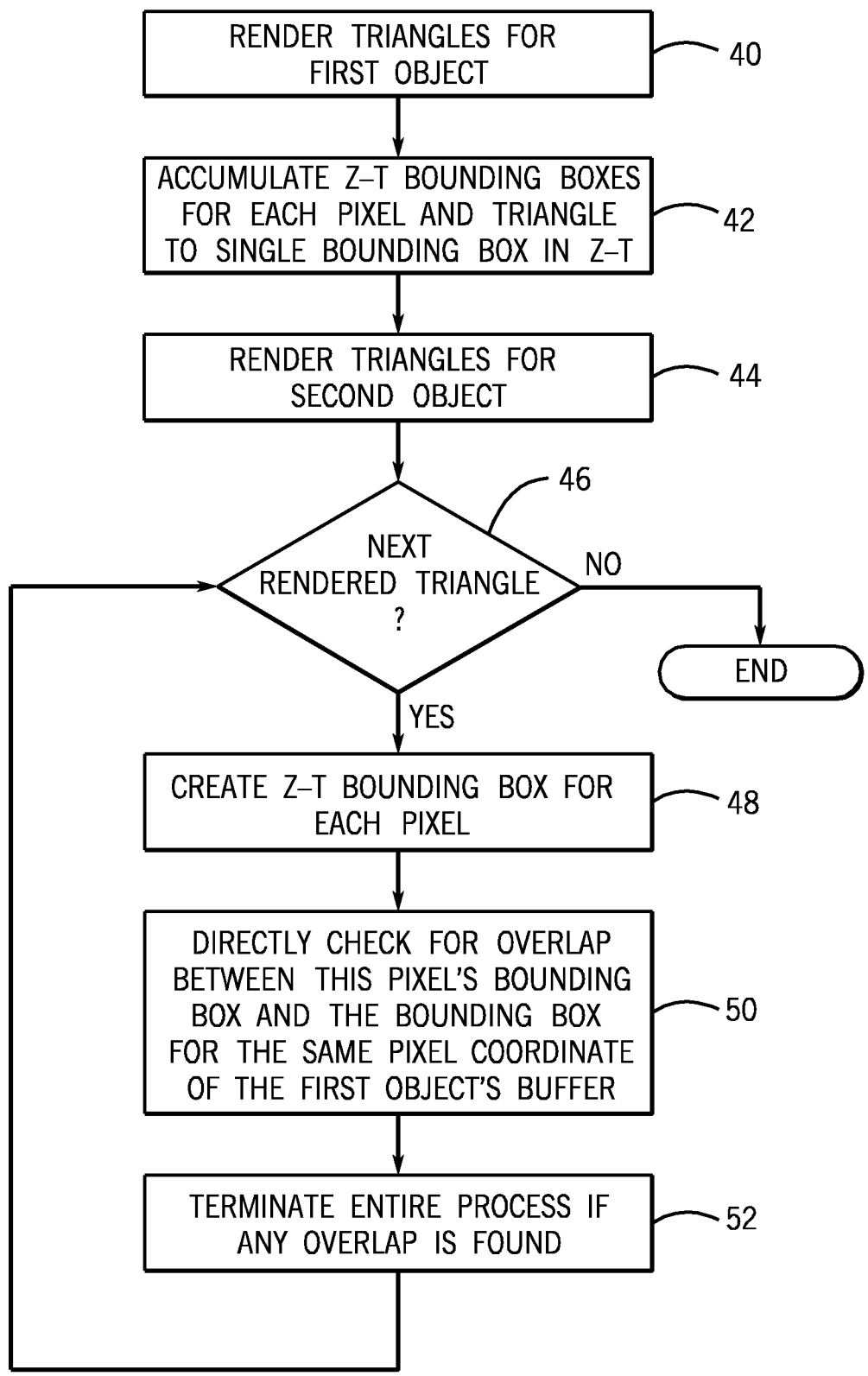
FIG. 4 is a flow chart for another embodiment.

FIGS. 3 and 4 are sequences that may be implemented in hardware, software and/or firmware. In software and firmware embodiments the sequence may be implemented by computer executed instructions stored in one or more computer readable media, such as optical, magnetic or semiconductor storage.

We start by rendering triangles for the first object, as shown at block 30 in FIG. 3 covering the situation where boxes do overlap as indicated on the left in FIG. 2. The z-t bounding boxes are accumulated, for each pixel and triangle, to a single bounding box in z-t, as shown as block 32. Triangles are then rendered for the second object (block 34). Next z-t bounding boxes for each pixel and triangle are accumulated into another buffer to a single bounding box in z-t. Finally all pixels in buffers are looped over followed by an overlap check. The loop is terminated if any overlap is found block 38. For each pixel and triangle, where the 1×1 tile test indicates overlap, we insert the time interval, t=[tmin, tmax], and the depth interval, z=[zmin, zmax], into a per-pixel buffer (block 36). For example, we can let RGBA=[tmin, zmin, tmax, zmax], which can be interpreted as a tz-fragment or an axis-aligned bounding box in tz. This is illustrated to the right in FIG. 1. Note that this approach is not using an occlusion query in the traditional sense.

According to another approach (corresponding to an alternative shown on the right side in FIG. 2), shown in FIG. 4, the triangles for the first object are rendered as indicated in block 40. Then z-t bounding boxes are accumulated for each pixel and triangle to a single bounding box in z-t as indicated in block 42. Next the triangles for the second object are rendered as indicated in block 44. A check at diamond 46 determines whether there is another rendered triangle. If so, a z-t bounding box is created for each pixel as indicated in block 48. Then the flow directly checks for overlap between this pixel's bounding box and the bounding box for the same pixel coordinate of the first object's buffer as indicated in block 50. The entire process is terminated if any overlap is found at block 52. The flow continues to iterate back to diamond 46 until all the rendered triangles have been processed.

Figure 5:
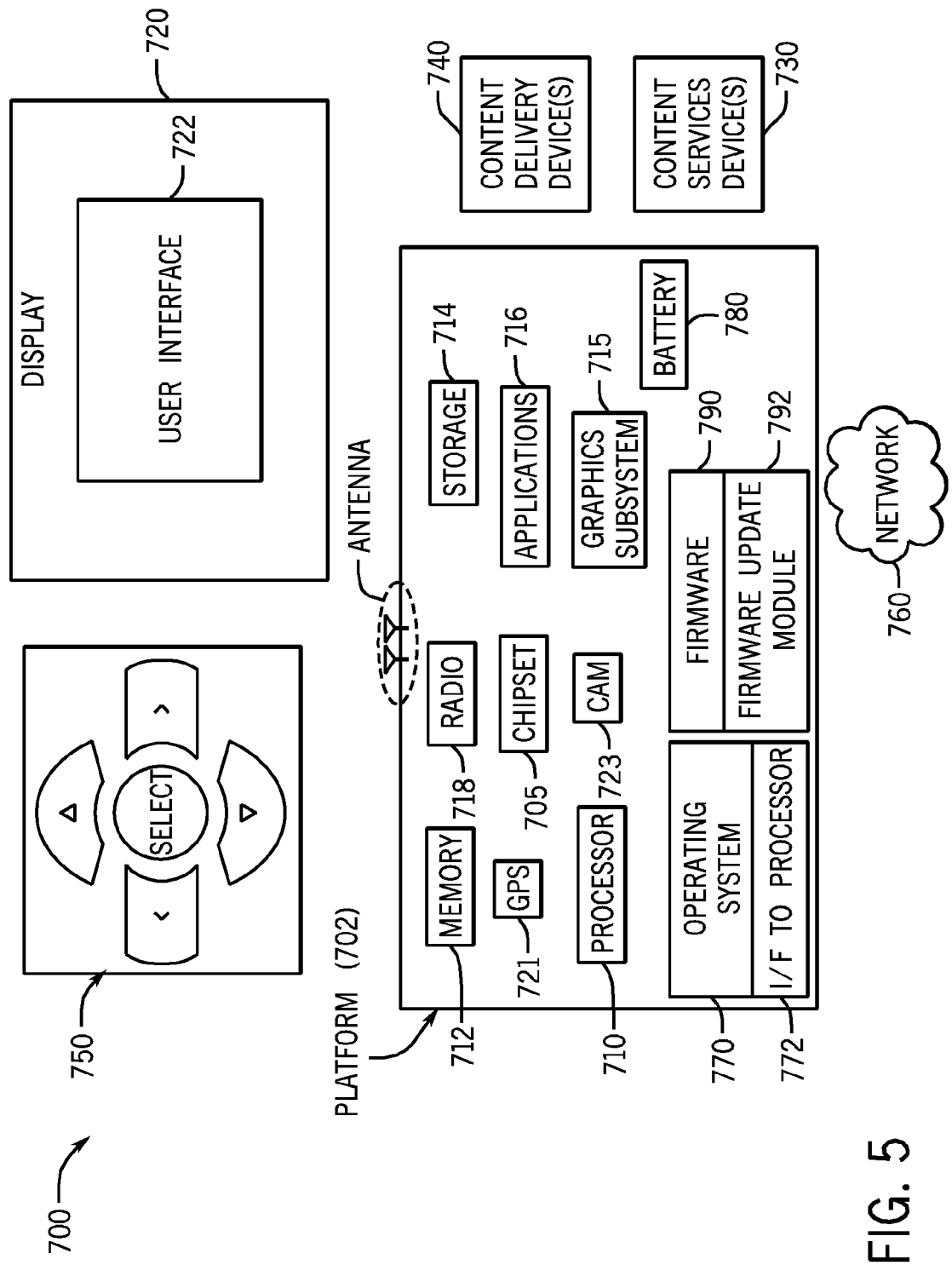
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 3 and 4 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 6:
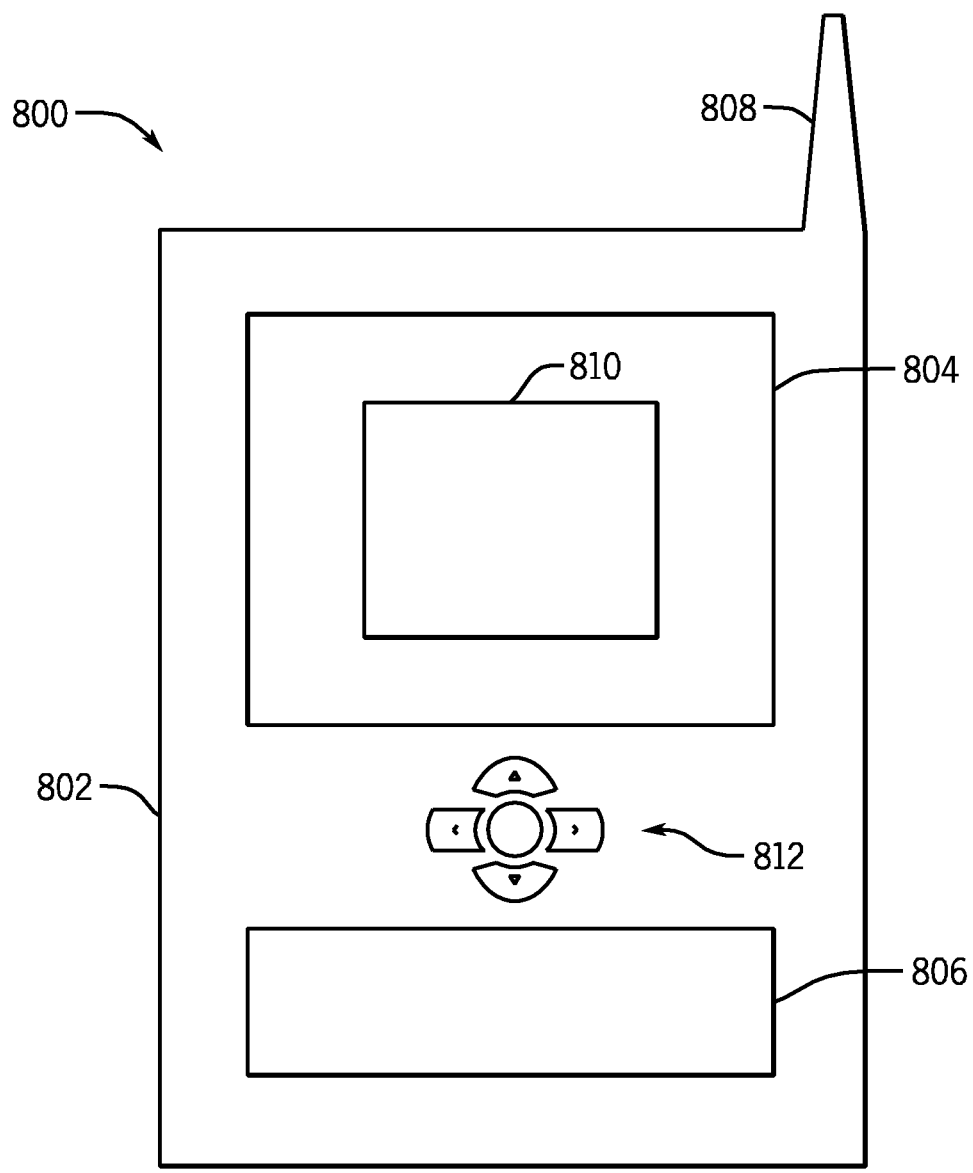
FIG. 6 is a front elevational view of one embodiment.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising rendering triangles for a first moving object in a graphics processor, accumulating bounding boxes in depth and time space for each pixel of the first moving object to a single bounding box in depth and time space, rendering triangles for a second moving object, determining whether a tile test indicates overlap between rendered triangles of said first and second objects and determining whether the tile test indicates overlap. The method may include using fragments in z-t space. The method may include using an axis-aligned bounding box in time and depth. The method may include extending collision detection to handle multiple triangles per object. The method may include initializing RGBA of each pixel to contain an empty bounding box. The method may include solving for collisions using a three-dimensional rasterizer. The method may include using one sample per pixel. The method may include using a tile size of 1×1 pixels. The method may include only sending pixels with non-empty triangle/pixel time overlap intervals to a pixel shader. The method may include accumulating z-t bounding boxes for each pixel and triangle to a single bounding box in z-t space again after rendering triangles for the second object. The method may include creating a z-t bounding box for each pixel after rendering triangles for the second object and checking for overlap between the pixel's bounding box and the bounding box for the same pixel coordinate of the first object's buffer. The method may include terminating if the tile test indicates overlap. The method may include determining whether bounding boxes for said first and second triangles overlap. The method may include during rasterization of said second moving objects, determining whether its fragments overlap with the single bounding boxes.

In another example embodiment may be an apparatus comprising a processor to render triangles for a first moving object, accumulate bounding boxes in depth and time space for each pixel of the first moving object to a single bounding box in depth and time space, render triangles for a second moving object, and determine whether a tile test indicates overlap between rendered triangles of said first and second objects, and a memory coupled to said processor. The apparatus may include said processor to terminate if the tile test indicates overlap. The apparatus may include said processor to determine whether bounding boxes for said first and second triangles overlap. The apparatus may include said processor, during rasterization of said second moving object, to determine whether its fragments overlap with the single bounding box. The apparatus may include said processor to use a time (t) depth (z)-fragment. The apparatus may include said processor to use an axis-aligned bounding box in time and depth. The apparatus may include said processor to extend collision detection to handle multiple triangles per object. The apparatus may include said processor to initialize RGBA of each pixel to contain an empty bounding box. The apparatus may include said processor to solve for collisions using a three-dimensional rasterizer. The apparatus may include said processor to use one sample per pixel. The apparatus may include said processor to use a tile size of 1×1 pixels. The apparatus may include said processor to only send pixels with non-empty triangle/pixel time overlap intervals to a pixel shader. The apparatus may include said processor to accumulate z-t bounding boxes for each pixel and triangle to a single bounding box in z-t space again after rendering triangles for the second object.

Another example embodiment may be one or more non-transitory computer readable media storing instructions to perform a sequence comprising rendering triangles for a first moving object in a graphics processor, accumulating bounding boxes in depth and time space for each pixel of the first moving object to a single bounding box in depth and time space, rendering triangles for a second moving object, determining whether a tile test indicates overlap between rendered triangles of said first and second objects, and determining whether the tile test indicates overlap. The media may include said sequence including using fragments in z-t space. The media may include said sequence including using an axis-aligned bounding box in time and depth. The media may include said sequence including extending collision detection to handle multiple triangles per object. The media may include said sequence including initializing RGBA of each pixel to contain an empty bounding box. The media may include said sequence including solving for collisions using a three-dimensional rasterizer. The media may include said sequence including using one sample per pixel. The media may include said sequence including using a tile size of 1×1 pixels. The media may include said sequence including only sending pixels with non-empty triangle/pixel time overlap intervals to a pixel shader. The media may include said sequence including accumulating z-t bounding boxes for each pixel and triangle to a single bounding box in z-t space again after rendering triangles for the second object. The media may include said sequence including creating a z-t bounding box for each pixel after rendering triangles for the second object and checking for overlap between the pixel's bounding box and the bounding box for the same pixel coordinate of the first object's buffer. The media may include terminating if the tile test indicates overlap. The media may include using a time (t) depth (z)-fragment. The media may include using an axis-aligned bounding box in time and depth. The media may include said sequence including determining whether bounding boxes for said first and second triangles overlap. The media may include said sequence including during rasterization of said second moving object, determining whether its fragments overlap with the single bounding box.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
rendering triangles for a first moving object in a graphics processor;
accumulating bounding boxes in depth and time space for each pixel of the first moving object to a single bounding box in depth and time space;
rendering triangles for a second moving object;
determining whether a tile test indicates overlap between rendered triangles of said first and second objects; and
determining whether the tile test indicates overlap.

2. The method of claim 1 including using fragments in z-t space.

3. The method of claim 1 including using an axis-aligned bounding box in time and depth.

4. The method of claim 1 including extending collision detection to handle multiple triangles per object.

5. The method of claim 4 including initializing RGBA of each pixel to contain an empty bounding box.

6. The method of claim 1 including solving for collisions using a three-dimensional rasterizer.

7. The method of claim 6 including using one sample per pixel.

8. The method of claim 7 including using a tile size of 1×1 pixels.

9. The method of claim 6 including only sending pixels with non-empty triangle/pixel time overlap intervals to a pixel shader.

10. The method of claim 1 including accumulating z-t bounding boxes for each pixel and triangle to a single bounding box in z-t space again after rendering triangles for the second object.

11. The method of claim 1 including creating a z-t bounding box for each pixel after rendering triangles for the second object and checking for overlap between the pixel's bounding box and the bounding box for the same pixel coordinate of the first object's buffer.

12. The method of claim 1 including terminating if the tile test indicates overlap.

13. The method of claim 1 including determining whether bounding boxes for said first and second triangles overlap.

14. The method of claim 1, including during rasterization of said second moving objects, determining whether its fragments overlap with the single bounding boxes.

15. An apparatus comprising:
a processor to render triangles for a first moving object, accumulate bounding boxes in depth and time space for each pixel of the first moving object to a single bounding box in depth and time space, render triangles for a second moving object, and determine whether a tile test indicates overlap between rendered triangles of said first and second objects; and
a memory coupled to said processor.

16. The apparatus of claim 15, said processor to terminate if the tile test indicates overlap.

17. The apparatus of claim 15, said processor to determine whether bounding boxes for said first and second triangles overlap.

18. The apparatus of claim 15, said processor, during rasterization of said second moving object, to determine whether its fragments overlap with the single bounding box.

19. The apparatus of claim 15, said processor to use a time (t) depth (z)-fragment.

20. The apparatus of claim 15, said processor to use an axis-aligned bounding box in time and depth.

21. The apparatus of claim 15, said processor to extend collision detection to handle multiple triangles per object.

22. The apparatus of claim 15, said processor to initialize RGBA of each pixel to contain an empty bounding box.

23. The apparatus of claim 15, said processor to solve for collisions using a three-dimensional rasterizer.

24. The apparatus of claim 15, said processor to use one sample per pixel.

25. The apparatus of claim 15, said processor to use a tile size of 1×1 pixels.

26. The apparatus of claim 15, said processor to only send pixels with non-empty triangle/pixel time overlap intervals to a pixel shader.

27. The apparatus of claim 15, said processor to accumulate z-t bounding boxes for each pixel and triangle to a single bounding box in z-t space again after rendering triangles for the second object.

28. One or more non-transitory computer readable media storing instructions to perform a sequence comprising:
rendering triangles for a first moving object in a graphics processor;
accumulating bounding boxes in depth and time space for each pixel of the first moving object to a single bounding box in depth and time space;
rendering triangles for a second moving object;
determining whether a tile test indicates overlap between rendered triangles of said first and second objects; and
determining whether the tile test indicates overlap.

29. The media of claim 28, said sequence including using fragments in z-t space.

30. The media of claim 28, said sequence including using an axis-aligned bounding box in time and depth.

31. The media of claim 28, said sequence including extending collision detection to handle multiple triangles per object.

32. The method of claim 31, said sequence including initializing RGBA of each pixel to contain an empty bounding box.

33. The media of claim 28, said sequence including solving for collisions using a three-dimensional rasterizer.

34. The media of claim 33, said sequence including using one sample per pixel.

35. The media of claim 34, said sequence including using a tile size of 1×1 pixels.

36. The media of claim 33, said sequence including only sending pixels with non-empty triangle/pixel time overlap intervals to a pixel shader.

37. The media of claim 28, said sequence including accumulating z-t bounding boxes for each pixel and triangle to a single bounding box in z-t space again after rendering triangles for the second object.

38. The media of claim 28, said sequence including creating a z-t bounding box for each pixel after rendering triangles for the second object and checking for overlap between the pixel's bounding box and the bounding box for the same pixel coordinate of the first object's buffer.

39. The media of claim 28 including terminating if the tile test indicates overlap.

40. The media of claim 28 including using a time (t) depth (z)-fragment.

41. The media of claim 28, including using an axis-aligned bounding box in time and depth.

42. The media of claim 28, said sequence including determining whether bounding boxes for said first and second triangles overlap.

43. The media of claim 28, said sequence including during rasterization of said second moving object, determining whether its fragments overlap with the single bounding box.

* * * * *